Patented June 16, 1942

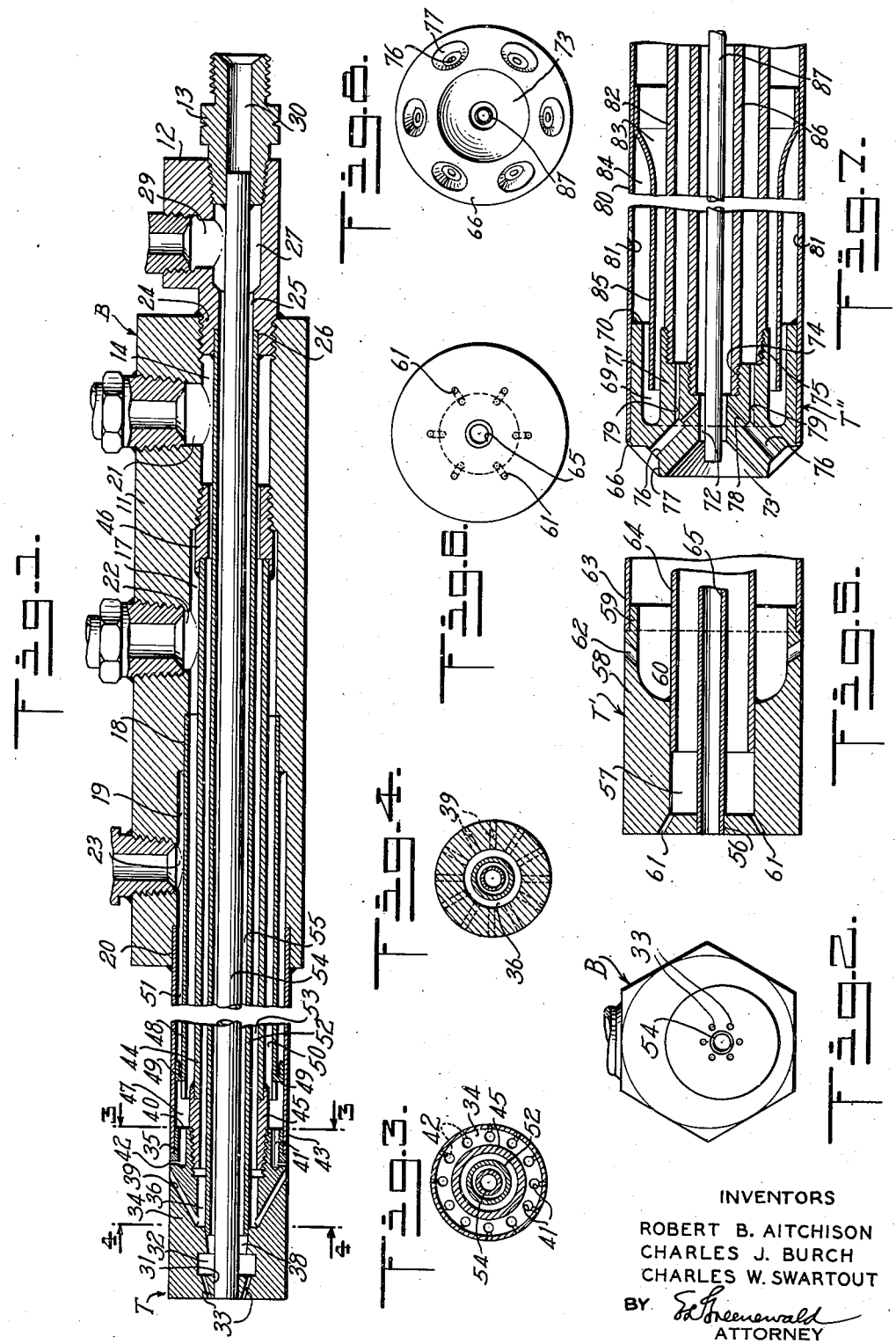

2,286,191

UNITED STATES PATENT OFFICE 2,286,191

MINERAL PIERCING AND CUTTING

Robert B. Aitchison, Staten Island, and Charles J. Burch and Charles W. Swartout, Kenmore, N. Y., assignors to The Linde Air Products Company, a corporation of Ohio Application April 18, 1939, Serial No. 268,633

19 Claims. (Cl. 262—1)

This invention relates to heating instrumentalities, and more particularly to heating instrumentalities, such as blowpipes, which may be used for performing heating operations within cavities, especially for thermally piercing, cutting, grooving or otherwise disintegrating compact minerals and mineral-like substances noncombustible in oxygen. Also contemplated by the invention is a novel process for thermally working minerals and like substances, as by piercing, cutting, grooving, or otherwise disintegrating them.

It has been found that holes for blasting or other purposes may be pierced in minerals and mineral-like substances, such as quartzite, dolomite, and hematite, by applying intense heat to localized areas and progressively advancing the heat into the substance to heat newly exposed areas as material is progressively removed under the influence of heat. Holes may be pierced to almost unlimited depths by continuously clearing the removed material from the hole as the heat is advanced. Ordinarily, thermal hole-piercing proceeds by either of two processes, a spalling process or a melting process, depending principally on the kind of substance to be pierced.

Both a spalling process and a melting process are described and claimed in patent application Serial No. 268,634, filed April 18, 1939, in the names of R. B. Aitchison, C. W. Swartout, and V. C. Williams. In a spalling process, briefly, heat is directed upon a localized area of a thermally spallable substance, such as quartzite, which spalls off as a dry fine sand or as small flakes under the action of heat alone. In certain cases the spallings may be too large to be lifted by the gaseous products of combustion, as from holes that are directed downwardly from the horizontal, and the gradual accumulation thereof in the hole may soon cause a halt in the operation unless steps are taken to clear the hole. Therefore, provision is made for discharging into the hole adjacent to the bottom thereof, and directed toward the mouth thereof, a fluid under pressure to eject spallings continuously as fast as they are produced. Water is most advantageous for ejection purposes as it dampens the debris and prevents the formation of injurious dust clouds; but air, or a mist of air and water, may often be used to good advantage when water alone is undesirable, as when piercing holes vertically downward. The necessary heat may be produced by burning a fuel in a combustion-supporting gas. A combustible fluid such as acetylene may be burned with oxygen, or the fuel may be an exothermically oxidizable metal such as aluminum, iron, or mixtures of aluminum and iron either alone or suspended in an inert gas or in a fuel gas such as acetylene.

In the melting process, as disclosed and claimed in said patent application, heat is applied to a localized area of a substance, such as hematite, which melts under the influence of heat and produces a more or less viscous slag. In order to increase the fluidity of this slag, it is essential in most cases to supply a flux to the melting zone. Heat, here also, may be supplied by the combustion in oxygen of a fuel, for instance a combustible fluid such as acetylene either with or without the addition of exothermically oxidizable metal powders such as iron, aluminum, or mixtures of iron and aluminum. Flux is best added to the melting zone by suspending in a gas stream either the flux itself or an oxidizable flux-forming material, in comminuted form, and blowing it into the melting zone. Slag ejection may be accomplished by continuously discharging a fluid under pressure adjacent to the bottom of the hole and directed toward the mouth thereof, although in some cases the gaseous products of combustion may exert sufficient force to accomplish this result. Either air, water, or an air-water mixture may likewise be used as an ejection medium in this process, depending upon the type of slag produced.

Heretofore, no heating instrumentality has been developed which is capable of safely and effectively carrying thermal hole-piercing to a practicable depth for blasting or other purposes. The main drawback to the satisfactory functioning of prior heating instrumentalities, particularly blowpipes, has been the problem of removing debris from the hole being pierced. After a certain very limited depth has been reached, the gaseous products of the heating operation are no longer capable of ejecting debris, and mechanical methods have been found slow, costly, and inefficient. Another serious disadvantage of prior instrumentalities resulted from their use of pre-mixed combustible gas mixtures, which have been found unsatisfactory for hole-piercing, or any heating operation within a cavity, because of the danger of explosive flashbacks occurring within the main body of the blowpipe if the hole or cavity is momentarily clogged up and the gas flow reversed by the pressure which then builds up. Furthermore, other instrumentalities have been incapable of producing a hole of sufficiently greater diameter than the instrumentality itself to provide enough clearance for the free passage of disintegrated material from the hole. Other instrumentalities, moreover, have been incapable of conducting therethrough, without clogging or excessive abrasive action, gases in which are suspended particles of comminuted solids.

An object of the present invention, therefore, is to provide a novel heating instrumentality which is adapted for carrying out heating operations in cavities.

Another object of this invention is to provide a novel heating instrumentality which is particularly adapted for safely, rapidly, and efficiently piercing, cutting, grooving, or otherwise disintegrating minerals and mineral-like substances.

Other objects of the invention are to provide a novel heating instrumentality which may be safely operated; which is light and easily portable; which is adequately protected against damage by heat; and in which the component parts may be removed and replaced simply and easily.

Still another object is to provide a novel process for thermally working minerals and like substances, as by piercing, cutting, grooving, or otherwise distintegrating them, which may be performed safely, rapidly, and efficiently.

The above and other objects will become apparent from the following description taken in connection with the accompanying drawing in which:

Fig. 1 is a longitudinal sectional view, partly in elevation, of a blowpipe embodying the principles of the invention, parts being broken away;

Fig. 2 is a front end elevational view of the blowpipe shown in Fig. 1;

Fig. 3 is a sectional view taken on the line 3—3 of Fig. 1 looking in the direction of the arrows;

Fig. 4 is a sectional view taken on the line 4—4 of Fig. 1 looking in the direction of the arrows;

Fig. 5 is a longitudinal sectional view of a front end portion of a modified form of blowpipe embodying the principles of the invention;

Fig. 6 is a front end elevational view of the blowpipe of Fig. 5;

Fig. 7 is a longitudinal sectional view, partly in elevation, of a front end portion of another modified form of blowpipe embodying the principles of the invention; and Fig. 8 is a front end elevational view of the blowpipe of Fig. 7.

In general, the invention contemplates the provision of an improved heating blowpipe which is adapted to produce intense heat at the front end thereof, and which is adapted to discharge a plurality of streams of a debris-ejection fluid from the peripheral surface near the front end thereof and directed at an angle to the blowpipe axis, preferably toward the rear of the blowpipe. Also, provision is made for cooling the blowpipe by means of a circulating fluid such as water. When the blowpipe is employed for piercing a hole in a mineral or mineral-like material such as rock, a "diffusion" type of flame is produced, the fuel and combustion-supporting gas being mixed after discharge in separate non-parallel streams from the blowpipe, preferably with the combustion-supporting gas stream or streams substantially surrounding the fuel stream. Intense heat is thus produced which either spalls or melts off material without any danger of flashbacks occurring within the blowpipe. The gaseous products of combustion supplemented by the ejection fluid streams impel the debris, in the form of either slag or spallings, through the clearance space surrounding the blowpipe toward the mouth of the hole, from which they are discharged. Either water, air, or a water-air mixture may be conducted through the blowpipe and discharged for slag ejection purposes with equal facility. The invention also concerns a process of thermally working a solid body of mineral or like material, as by piercing, cutting, grooving, or the like, which process comprises discharging, from a blowpipe, or other suitable source means within a selected substantially enclosed region of the mineral body, a stream of fuel gas and a separate flowing body of combustion-supporting gas surrounding the stream of fuel gas. The two gases are discharged in such a way that they mix together outside the source means and form a combustible gas mixture within the enclosed region, and the intense heat produced as the gas mixture burns disintegrates an adjacent zone of the mineral body. The source means is advanced progressively within the mineral body, to similarly produce heat adjacent successive zones of the body and progressively disintegrate them. Concurrently with the heating and disintegrating, the disintegrated material is removed by a flowing stream of an ejection fluid from adjacent the zones being disintegrated. It is often desirable for the centrally arranged stream of fuel gas to carry in suspension therein finely-divided combustible metal, which burns in the enclosed region to furnish supplemental heat, and may in some cases act as a flux on the mineral material.

When the process is used for piercing holes, the flame from the burning combustible gas mixture is directed against a selected area on a face of the mineral body, thereby producing the initial portion and mouth of the hole. The source means then is advanced into the initial portion of the hole and into successive portions of the hole, as formed, thereby forming successively deeper portions of the hole. The disintegrated material is removed by ejection fluid flowing rearwardly from adjacent the zones being disintegrated, toward the mouth of the hole.

The embodiment of the invention illustrated in Fig. 1 comprises a blowpipe having a body B, a tip T, and a plurality of concentric tubes communicating between the body B and the tip T. The tip T is provided with suitable means for discharging a fuel and a combustion-supporting gas in separate adjacent streams from the forward end thereof, as well as with means for discharging a plurality of debris-ejection fluid streams from the peripheral surface of the tip toward the rear of the blowpipe. A means is also provided in the tip T for discharging a plurality of small jets of a suitable cooling fluid laterally from the peripheral surface of the tip for the further purpose of dampening or wetting the debris produced in piercing when such dampening is desirable. The fuel, combustion-supporting gas, debris-ejection fluid, and cooling fluid are admitted to the appropriate tubes through inlet connections associated with the body B, and are thence conducted to the appropriate discharge means in the tip T. In most cases, for debris-dampening purposes, it is only necessary to discharge from the tip a small proportion of the total amount of cooling fluid supplied, and, therefore, to secure the maximum cooling effect, the remainder of the cooling fluid is conducted to the forward end of the blowpipe and is then returned rearwardly to the body B where a suitable outlet connection is provided.

Such a blowpipe is especially suitable for the piercing of holes in minerals or mineral-like substances, such as rock, by either the spalling process or the melting process.

More specifically, as shown in Fig. 1, the blowpipe comprises a body B including a front block 11, a header 12 threadedly secured to the rear end of the block 11, and an inlet nipple 13 threadedly secured to the rear end of the header 12. The front block 11 has a longitudinal passage or bore 14 at the rear end thereof threaded at both its front and rear ends. Forwardly of the bore 14, in continuation thereof and axially alined therewith, is a series of four longitudinal counterbores 17, 18, 19, and 20 of progressively increasing diameter toward the front of the block. Internally threaded lateral inlets 21 and 22 open into the bore 14 and the counterbore 17, respectively; and an internally threaded lateral outlet 23 communicates with the counterbore 19. The rearwardly extending header 12, which is threaded into the rear end of the block bore 14 by means of an externally threaded nipple 24 at its front end, is provided with a longitudinal passage or bore 25 opening at its front end into a front counterbore 26 and at its rear end into a rear counterbore 27 having a threaded portion in the rear end thereof. An internally threaded lateral inlet 29 opens into the header counterbore 27 intermediate the ends thereof. The inlet nipple 13, which has a longitudinal passage 30 extending therethrough, is externally threaded at each end thereof, the front end being secured within the header counterbore 27 so that the nipple projects rearwardly therefrom. Suitable connecting nipples may be threaded within the rear body inlets 21, 22, and 29, and within the outlet 23, for connection with supply and discharge lines, respectively.

A tip T, at the front of the blowpipe, comprises a cylindrical block of copper or other metal or alloy of high heat conductivity, which is provided with a longitudinal axial passage or bore 31 at the front thereof communicating at its rear end with an enlarged gas distributing chamber having a cylindrical portion 32 and a conical portion 38, and at its front end communicating with the atmosphere through an orifice in the front face of the tip. A plurality of ducts 33, which converge forwardly toward the passage 31 and towards each other, have orifices in the front face of the tip substantially equally spaced from one another in an annular zone around and adjacent to this passage 31 in laterally spaced relation thereto, thus establishing communication between the chamber 32 and the atmosphere at the front of the tip. A rearwardly projecting annular flange 34, having an annular external reduced portion 35 at the rear end thereof, forms in the rear end of the tip an enlarged substantially cylindrical cavity or socket 36 having an internally taper-threaded portion in the rear end thereof. The socket 36 is in communication with the main portion of the gas distributing chamber 32 through the longitudinal axial passage 38 having forwardly convergent conical walls adapted to act as a seating surface. A plurality of lateral ports 39, having orifices substantially equally spaced from one another in a ring about the peripheral surface of the tip T and spaced a short distance back of the tip front end, extend through the flange 34 and are in communication with the socket 36 adjacent to the front end thereof. Each of the ports 39 is inclined at an angle to the axis of the blowpipe toward the rear thereof in such a manner that the axis of each port 39 will lie in a plane extending radially from the longitudinal axis of the blowpipe. The tip T is also provided with a plurality of discharge passages 40 comprising longitudinal holes 41 having orifices in the rear face of the flange 34 at the rear of the tip, and corresponding radial holes 42 opening into the holes 41 adjacent to the front ends thereof and having orifices on the peripheral surface of the tip. Preferably, the discharge passages 40 are so arranged that the orifices on the peripheral surface of the tip T are substantially equally spaced from one another in a ring about the circumference of the tip, and each orifice lies immediately in the rear of the orifice of a port 39.

Communication between the tip T and the rear body B is established by means of a plurality of concentric tubes extending therebetween. Secured at its front end to the tip T is an elongated cylindrical casing 43 which fits over the reduced portion 35 of the tip in such a way that the peripheral surfaces of the tip and the casing form a smooth and substantially continuous joint. The rear end of the casing 43 is secured within the front counterbore 20 in the front block 11 of the body B.

An elongated pipe 44, having externally threaded adapters 45 and 46 secured respectively to the front and rear ends thereof, is disposed substantially concentrically within the casing 43 in laterally spaced relation thereto, and the adapters 45 and 46 are threadedly secured within the threaded portion of the tip socket 36, and into the threaded front portion of the block bore 14, respectively. The annular passage 47 formed between the pipe 44 and the casing 43 extends from the interior of the block 11 to the rear end of the tip T and communicates within the block 11 with the inlet 22 and the outlet 23, ahead of and spaced from the inlet 22. A cylindrical baffle 48 is disposed concentrically between the casing 43 and the pipe 44 and is secured at its rear end within the block counterbore 18 between counterbores 17 and 19, acting as a seal between these two counterbores. The baffle 48 terminates at its front end a short distance in back of the rear end of the tip T, and is held in laterally spaced relation to the casing 43 and the pipe 44 by means of a plurality of spacers 49 contacting the internal wall of the casing 43, and formed by notching the front end of the baffle and bending back the part between notches. With this baffle 48 in position, the annular passage 47 is split into a forward passage 50, into the rear end of which opens the inlet 22, and a return passage 51, from the rear end of which opens the outlet 23.

An elongated conduit 52, concentrically disposed within the pipe 44 in laterally spaced relation thereto, is secured at its rear end within the front counterbore 26 of the header 12, and is seated at its front end tightly against the conical seating surface 38 in the tip T, thus forming a seal between the socket 36 and the chamber 32. The passage 53 formed between the pipe 44 and the conduit 52 is in communication at its rear end with the inlet 21 of the block 11 and at its front end opens into the tip socket 36.

An elongated central tube 54 is concentrically disposed within the conical tip passage 38, the conduit 52, and the header passage 25 in laterally spaced relation thereto. The tube 54 is secured at its rear end to the inlet nipple 13 within the nipple passage 30, and closely fits at its forward end within the axial tip passage 31, with its front end surface substantially flush with the front face of the tip T, thus acting as a seal to prevent communication through the passage 31 between the chamber 32 and the atmosphere. Of course, the tube 54 may terminate in back of the front face of the tip T, and when so arranged, it will open into the passage 31 of the tip. The annular passage 55 formed between the conduit 52 and the tube 54 is in communication at its rear end with the inlet 29 of the header 12, and at its front end opens through the conical passage 38 into the gas-distributing chamber 32 in the tip T. The passage through the elongated tube 54 is continuous with the longitudinal inlet nipple passage 30, and at its front end opens into the atmosphere at the front of the tip T.

For purposes of replacement or repair, the central tube 54 may be removed readily from the blowpipe by simply backing the threaded inlet nipple 13 out of the counterbore 27 in the header 12. Also, the conduit 52 may be removed by backing the threaded header nipple 24 out of the block bore 14, thus breaking the soft solder joint holding the two together.

In operating the blowpipe of Fig. 1, a fuel, such as acetylene for example, or a fuel-powder mixture, such as acetylene in which are suspended particles of a solid comminuted flux or of a flux-forming material, such as iron powder, is admitted through the inlet nipple 13 at the rear of the blow-pipe to the central tube 54 through which it is conducted to the tip T and discharged in a longitudinal stream from the front end of the blowpipe. As the passage through the tube 54 is unconstricted and continuous with the passage 30 in the nipple 13, there is no possibility that powder particles will settle out of the gas stream and clog the passage, as is inevitable when the mixture must change direction sharply or pass through constrictions. Also, erosion of the blowpipe resulting from the abrasive action of the powder is reduced to a minimum.

A combustion-supporting gas, such as oxygen for example, is admitted through the lateral inlet 29 to the rear counterbore 27 of the header 12 concurrently with the admission of fuel to the blowpipe. The oxygen then passes through the header bore 25 into the conduit 52 through which it passes to the tip T, enters the gas distributing chamber 32 through the conical-walled passage 38, and is discharged from the front end of the blowpipe through the ducts 33 in a plurality of enveloping streams adjacent to and converging toward the central fuel stream and toward each other. The non-parallel streams of oxygen and fuel mix intimately externally of the blowpipe by diffusing one into the other, and by the aspirating action of the oxygen streams, and may be ignited to produce a very hot concentrated flame ahead of the tip T. When the blowpipe is used in a cavity, mixing is further improved by the turbulence resulting in the enclosed space. If an oxidizable flux-forming powder is suspended in the fuel stream, this also oxidizes simultaneously with the fuel.

A fluid under pressure, such as air, water, or a mixture of air and water as a fine mist, is admitted through the inlet 21 to the longitudinal bore 14 of the block 11, passes forwardly through the pipe 44 to the socket 36 in the tip T, and is discharged at high velocity from the peripheral surface of the tip T in a plurality of rearwardly directed streams through the ports 39.

For the purpose of cooling the blowpipe a fluid, such as water, for example, is admitted to the counterbore 17 in the block 11 through the inlet 22, passes forwardly to the rear end of the tip T through the annular passage 50 between the pipe 44 and the baffle 48, and then returns to the block counterbore 19 through the annular return passage 51 between the baffle 48 and the casing 43, from which it is discharged from the blowpipe through the outlet 23. A part of the cooling water also passes through the discharge passages 40 in the tip T and is discharged radially in a plurality of jets from the peripheral surface of the tip. As each of the discharge passages 40 is preferably immediately in the rear of a port 39, the stream of air or other ejection fluid issuing from the port impinges upon and deflects the water jet rearwardly and disperses the water as a fine spray. At times, the use of such water jets may be unnecessary, and on such an occasion, the discharge passages 40 may be plugged to prevent the emission of water from the tip. When the fluid employed for ejecting debris from a hole is water, the ejection water itself cools the blowpipe sufficiently so that a separate cooling medium becomes unnecessary and may be eliminated. A blowpipe which is used continuously for piercing material requiring the use of water as the ejection fluid may be constructed without any provision for separate water cooling whatsoever if desired. For most versatile operation, however, a separate water cooling means is essential.

In carrying out the piercing of a blast hole or similar hole in a thermally spallable material such as rock by means of the blowpipe of the invention, the intense flame produced at the front of the tip T progressively and rapidly heats the surfaces of the material to cause particles to spall off, and the spallings are ejected from the hole as fast as they are produced and concurrently with the heating operation by means of the rearwardly-directed ejection fluid streams discharging from the ports 39. If compressed air is used as the ejection fluid, the spallings are best dampened by jets of cooling liquid discharging from the passages 40, as previously described, so that the operation is substantially dustless. The operation is made continuous by advancing the blowpipe into the hole as particles progressively spall off in advance thereof and continuously removing spallings concurrently with the heating operation. In spite of the high temperatures attained within a hole, no damage results to the blowpipe because of the provision for water cooling. When piercing holes by a melting process, the blowpipe operates in a similar manner. If difficulty in maintaining the blowpipe centered in a hole is encountered, it may be desirable to provide automatic centering means. For example, a plurality of outstanding radial fins may be secured to the periphery of the blowpipe to act as skids upon which the blowpipe may ride at the desired distance from the hole walls.

In Figs. 5 and 6 is shown the forward, operating end of a modified form of a blowpipe embodying the principles of the invention. In this form of the invention, a tip T' is provided with means for discharging a central longitudinal stream of fuel, or a fuel-powder mixture, from the front end thereof, with means for discharging a plurality of enveloping oxygen streams from the front end thereof diverging forwardly from the central fuel stream and from each other; and with means for discharging a plurality of ejection fluid streams in a rearward direction from the peripheral surface of the tip. Suitable means are also provided for conducting fuel, oxygen, and ejection fluid to the respective discharge means from the rear body of the blowpipe (not shown).

As shown in Fig. 5, the tip T' comprises a substantially cylindrical block of copper, or other metal or alloy of high heat conductivity. The tip T' is provided, at the front end thereof, with a short longitudinal axial bore or passage 56 having an orifice in the front face of the tip and communicating at its rear end with an enlarged substantially cylindrical chamber 57. A rearwardly projecting annular flange 58, having an annular portion 59 slightly reduced in diameter at the rear thereof, forms a large diameter cylindrical socket 60 in the rear end of the tip T', into the bottom of which opens the chamber 57. A plurality of ducts 61 extend through the front of the tip T', have orifices in the tip front face substantially equally spaced from one another and arranged in an annular ring about and adjacent to the axial passage 56, and diverge forwardly from the passage 56 and from one another. The ducts 61 open at their rear ends into the chamber 57 adjacent to the outer edge thereof. A plurality of ports 62, having orifices on the external peripheral tip surface, extend through the annular flange 58 and establish communication between the socket 60 and the atmosphere. These ports are inclined at an angle to the blowpipe axis and are most advantageously inclined toward the rear of the blowpipe in such a manner that the axis of each port 62 lies in a plane extending radially from the blowpipe axis. An elongated casing 63 of substantially the same outside diameter as the tip T' fits over the reduced portion 59 of the flange 58 and is secured thereto, thus making the joint between the peripheral surfaces of the tip and the casing smooth and substantially continuous. An elongated conduit 64 is disposed substantially concentrically within the casing 63 in laterally spaced relation thereto and is secured at its front end to the tip T' within the chamber 57, thus forming a seal between the socket 60 and the chamber 57. A tube 65 is disposed substantially concentrically within the conduit 64 in laterally spaced relation thereto and fits at its front end closely within the tip passage 56, thus forming a seal to prevent communication through the passage 56 between the chamber 57 and the atmosphere. All three of these supply pipes 63, 64 and 65 extend to the rear end of the blow-pipe and there establish communication with suitable inlet connections (not shown).

In the operation of the blowpipe of Fig. 5, a fuel such as acetylene or an acetylene-powder mixture, as has been described previously, is conducted through the tube 65 to the tip T' and discharged in a central stream from the forward end thereof. A combustion-supporting gas such as oxygen is conducted through the conduit 64 to the chamber 57 in the tip T' and is thence distributed to the forwardly diverging ducts 61 and discharged in a plurality of jets from the front of the tip, where it forms an envelope about the central fuel stream. An ejection fluid, such as water, is conducted through the casing 63 to the socket 60 and is there distributed to the ports 62 from which it is discharged in a plurality of streams from the periphery of the tip at an angle to the blowpipe axis, preferably in a rearward direction.

With the blowpipe construction described, a broad flaring high temperature diffusion flame is produced in advance of the blowpipe tip which is adapted to heat a relatively large area of the material to be pierced. The advantage of such a flame is that a hole of considerably larger diameter than that of the blowpipe itself is produced, thus increasing the clearance space through which slag or spallings may be ejected and decreasing the possibility of clogging in the hole. This blowpipe is particularly advantageous for piercing holes in materials which permit the use of a liquid or of a gas-liquid mixture for slag ejection, as no auxiliary cooling means is provided. In the spalling process of hole piercing, for instance, the temperature within the hole in the rear of the reaction zone is relatively low so that the slag-ejection fluid itself is sufficient for cooling purposes and need not be augmented by other cooling means.

The forward operating end of a second modified form of blowpipe embodying the principles of the invention is shown in Figs. 7 and 8. In this form of the invention there is provided a tip T'' having means for discharging a longitudinal axial stream of a fuel from the forward end thereof; means for discharging an outwardly flaring stream of a combustion-supporting gas, such as oxygen, in an enveloping sheet around the central fuel stream; and means for mixing fuel and oxygen within the tip and for discharging from the tip surface the combustible mixture so formed in a plurality of small streams around the envelope of oxygen and flaring outwardly from the axis of the blowpipe at an angle thereto. The blowpipe is also provided with means adjacent to the forward end thereof for discharging a plurality of debris-ejection fluid streams laterally from the peripheral surface at an angle to the blowpipe axis, the streams preferably being directed toward the rear of the blowpipe. In this modification, the ejection fluid also serves as a cooling medium.

As shown in Fig. 7, the tip T'' comprises a cylindrical block, of copper or other metal or alloy of high heat conductivity, having a portion at the front thereof tapered forwardly toward the axis of the tip, forming an annular frusto-conical or bevelled surface 66. A deep annular groove 69 in the rear end of the tip T'' forms an external rearwardly projecting annular flange 70 and a substantially cylindrical rearwardly projecting internal boss 71. A longitudinal passage or bore 72 extends substantially axially through the tip T'', and opens at its front end into a forwardly-flaring conical-walled orifice 73 substantially coaxial therewith at the front of the tip. At its rear end, the passage 72 opens into an internally-threaded counterbore 74 in the boss 71, which in turn opens into an internally-threaded socket 75 in the rear end of the boss 71. The passage 72, the counterbore 74, and the socket 75 are of progressively increasing internal diameter toward the rear of the tip. A plurality of holes 76, arranged in a ring about the blowpipe axis, and inclined at an angle forwardly and outwardly from said axis, have conical apertures 77 in the bevelled surface 66 of the tip substantially equally spaced from one another about the circumference of the bevel. An inclined duct 78 extending from the bottom of each of said holes 76, communicates with the passage 72 near the rear end thereof; and a longitudinal passage 79 opens into each of said holes 76 adjacent to the bottom thereof and communicates at its rear end with the socket 75 adjacent to the outer edge thereof.

The tip T" is connected to a rear body of the blowpipe (not shown) by means of a plurality of concentric tubes which are adapted to conduct fluids therethrough. A casing 80, which may be formed of a heat and abrasion resistant metal or alloy such as stainless steel, having substantially the same inside diameter as the outside diameter of the tip T" is secured to the rear body, and at its front end fits snugly over and is secured to the tip T". As shown, the casing 80 completely sheaths the outside of the tip and protects the tip from erosion or other damage which might occur in operation. This is particularly advantageous when the tip is formed of copper or other metals or alloys which are relatively soft. A series of lateral ports 81, extending through the wall of the casing adjacent to the front end of the blowpipe, are substantially equally spaced from one another about the circumference of the blowpipe and are angularly inclined to the blowpipe axis, preferably being inclined toward the rear of the blowpipe. A conduit 82 disposed substantially concentrically within the casing 80 in laterally spaced relation thereto is also secured at its rear end to the rear body and is threadedly secured to the tip 30 at its front end within the socket 75. The annular space thus formed between the casing 80 and the conduit 82 is split into a forward passage 83 and a return passage 84 by means of a generally cylindrical baffle 85 disposed between the casing 80 and the conduit 82. The baffle 85 is secured at its rear end to the internal wall of the casing 80 and extends at its front end within the annular groove 69 in spaced relation to the walls thereof to a point adjacent to but spaced from the bottom of the groove. A pipe 86 disposed substantially concentrically within the conduit 82 in laterally spaced relation thereto is secured to the rear blowpipe body at its rear end and at its front end is threadedly secured in the counterbore 74. A tube 87 disposed substantially concentrically within the pipe 86, in laterally spaced relation thereto, is likewise secured at its rear end to the rear body, and at its front end extends through the tip passage 72 in laterally spaced relation to the walls thereof and projects a short distance into the conical orifice 73 in the front of the tip.

In the operation of this modified form of the blowpipe of the invention, a fuel such as acetylene is admitted to both the tube 87 and the conduit 82 through suitable inlet connections at the rear of the blowpipe. A combustion-supporting gas such as oxygen and an ejection fluid such as compressed air, water, or an air-water mixture, which also acts as a cooling medium, are admitted to the pipe 86 and the casing 80, respectively, through suitable inlet connections, also at the rear of the blowpipe. The fuel entering the central tube 87 is conducted to the front end thereof and discharged in an axial stream from the front of the tip. Combustion-supporting gas is carried through the pipe 86 to the passage 72 in the tip T" and the main portion thereof exits from the tip at a reduced velocity through the conical orifice 73 as a flaring annular sheet or envelope of gas surrounding the central fuel gas stream. A portion of the combustion-supporting gas, however, is diverted from the passage 72 through the inclined ducts 78 to the holes 76 where it mixes intimately with a secondary supply of fuel gas which has been carried through the conduit 82 and the passages 79 to the holes 76. The combustible gas mixture thus formed in the holes 76 is discharged from the apertures 77 in a plurality of flaring streams directed outwardly from the tip at an angle inclined forwardly from the blowpipe axis. An ejection fluid, preferably water, is admitted to the casing 80 at the rear of the blowpipe and conducted through the down passage 83 to the tip from which it returns through the return passage 84 toward the rear of the blowpipe and is ejected in a plurality of high pressure streams from the peripheral blowpipe surface through the ports 81 adjacent the front end thereof. Preferably these streams are directed toward the rear of the blowpipe although in some instances, other directions might be desirable.

The fuel gas and combustion-supporting gas leaving the front end of the blowpipe in separate streams mix one with the other, and, when ignited, produce a flaring high temperature "diffusion" type flame at the tip. Mixing is especially efficient here because the fuel gas must pass through a solid sheet of enveloping combustion-supporting gas. The streams of combustible gas mixture leaving the apertures 77, when ignited, produce a ring of outwardly flaring flames around the "diffusion" flame. When using this blowpipe for piercing a hole, the flaring premixed gas flames produce a hole of large diameter leaving a clearance around the blowpipe through which debris may be ejected without danger of clogging. Furthermore, the gases in the diffusion type flame, as well as the powders sometimes carried therein, are more efficiently and completely burned because of the surrounding ring of auxiliary premixed gas flames. Another advantage of this blowpipe is that, when used in a melting process for hole piercing, the high velocity premixed gas flames directed upon the molten slag at the sides of the hole promote the solution of gases therein, thus producing, when the slag is quenched by water, a porous friable slag which will disintegrate and may then be ejected from the hole without any difficulty.

Instead of using auxiliary premixed fuel-oxygen flames, it may sometimes be advantageous to employ premixed fuel-air flames. Such a mixture may be obtained by aspirating air into the acetylene stream passing to the blowpipe tip. With a fuel-air flame, the danger of flashbacks is eliminated as any clogging in the hole will simply force the backward flowing fuel to exhaust to the atmosphere through the air intake ports. The danger of flashbacks is negligible in the blowpipe described in the foregoing. As the main flame is of the "diffusion" type, resulting from the mixture of gases subsequent to their discharge from the blowpipe, clogging of the hole being made will not cause a recession of the flame inside the blowpipe. Although there is a remote possibility of a flashback occurring in the premixed gas passages, the volume of gas passing through is small, and the intensity of the flashback would be slight. Moreover, any flashback would be confined to the tip itself where no serious damage could result.

Although the heating instrumentality of the invention has been described principally as one designed to utilize a combustible mixture of fuel and a combustion-supporting gas for heating purposes, other sources of heat may be employed with excellent results. For example, an instrumentality having provision for debris-ejection and debris dampening, as well as for cooling, may be used in association with pairs of electrodes at the forward end thereof for producing high temperature electric arcs. Means may also be provided for conducting a powdered flux to the heating zone. If a preformed flux is used, this may be suspended in any desired gas for conduction to the melting zone. If an additional material is employed, however, which must be oxidized either for the production of heat, for the formation of a flux, or for both purposes, oxygen gas may be used as the medium of conveyance, although this is ordinarily a relatively dangerous procedure which must be carefully controlled to operate satisfactorily.

Although the heating instrumentality of the invention has been described primarily in connection with the piercing of blast holes in minerals or mineral-like substances, it is evident that such instrumentalities are susceptible of use for other purposes, and particularly for uses where heat is applied to objects within cavities where the danger of flashbacks is great. Such heating instrumentalities may be used not only for thermally operating upon minerals or mineral-like substances but also for thermally operating upon metallic substances which may be either combustible or non-combustible in oxygen.

We claim:

1. A heating instrumentality for thermally piercing holes in minerals or mineral-like materials comprising, means for directing heat on the bottom of a hole; means for discharging a debris-ejection fluid into such hole adjacent to the bottom thereof and directed toward the mouth thereof; and separate means for discharging a debris-wetting liquid into such hole adjacent to the bottom thereof.

2. In a heating instrumentality, means for producing heat adjacent to the forward end thereof; means adjacent to the forward end thereof for discharging an ejection fluid in a rearward direction therefrom; means for conducting a cooling and dampening liquid to a point adjacent to the forward end thereof; and means for discharging at least a part of said liquid from said instrumentality adjacent to the forward end thereof.

3. A heating instrumentality comprising, in combination, a tip having a distributing chamber therein adapted to distribute a first fluid, a front face, and a passage communicating with said chamber and having its outlet in said front face; passage means adjacent to the front of said instrumentality for discharging debris-ejection fluid rearwardly relative to said tip; a tube adapted for the flow of a second fluid therethrough, said tube being disposed at its front in position for discharge of the second fluid through said outlet, and said tube being associated at its front with said tip in gas-tight relation thereto to provide a seal between said passage and said chamber; said tip also having one or more orifices in said front face constructed and arranged to discharge the first fluid around said outlet, and one or more ducts connecting said distributing chamber to said one or more orifices; means for supplying said chamber with said first fluid; and means for supplying fluid to said debris-ejection fluid discharge means.

4. A heating instrumentality comprising a tip having a distributing chamber therein; said tip having a longitudinal passage at the front thereof communicating with said chamber and having an orifice in the tip front face; said tip having a plurality of ducts communicating with said chamber and having orifices in said tip front face adjacent to the orifice of said first passage; said tip having a cavity in the rear thereof; and said tip having a plurality of ports for the discharge of debris-ejection fluid in a rearward direction relative to said tip communicating with said cavity and having apertures on the peripheral surface of said tip; an elongated tube fitted at the front end thereof into said longitudinal tip passage; an elongted conduit surrounding said tube and opening at its front end into said chamber; and an elongated pipe surrounding said conduit and opening at its front end into said cavity.

5. A heating instrumentality comprising a tip having a gas distributing chamber therein; said tip having a first longitudinal passage at the front thereof communicating with said chamber and having an orifice in the front face of said tip; said tip having a plurality of ducts communicating with said chamber and having orifices in the tip front face adjacent to the orifice of said first passage; said tip having a cavity in the rear thereof; said tip having a second longitudinal passage communicating between said cavity and said chamber; and said tip having a plurality of ports for the discharge of debris-ejection fluid in a rearward direction relative to said tip communicating with said cavity and having apertures on the tip peripheral surface; a rear body; an elongated pipe associated at its front end with said tip and at its rear end with said rear body, said pipe being in communication with said tip cavity; an elongated conduit disposed within said pipe and associated at the rear end thereof with said rear body, said conduit fitting at its front end within said second tip passage and contacting the wall thereof to form a seal; an elongated tube disposed within said conduit and associated at the rear end thereof with said rear body, said tube closely fitting at the front end thereof within said first tip passage; an inlet connection communicating with said elongated pipe; a second inlet connection communicating with said elongated conduit; and a third inlet connection communicating with said elongated tube.

6. A heating instrumentality comprising a tip having a longitudinal passage terminating in a flaring orifice at the forward end thereof; said tip having a plurality of side passages inclined forwardly and outwardly from the axis of said instrumentality and having apertures in the surface of said tip arranged about said flaring orifice, said side passages being in communication with said longitudinal passage; a tube disposed in said longitudinal passage and extending at the front thereof into said orifice; a conduit surrounding said tube and communicating with said longitudinal passage; a pipe surrounding said conduit and communicating with said side passages; and a casing surrounding said pipe; said instrumentality having adjacent to the front end thereof a plurality of ports communicating with the interior of said casing, said ports being constructed and arranged to discharge fluid therefrom generally toward the rear of said instrumentality.

7. A process of thermally working a solid body of mineral or like material, which process comprises discharging, from suitable source means within a selected substantially enclosed region of said body, a stream of fuel gas carrying in suspension therein finely-divided combustible metal, and a separate flowing body of combustion-supporting gas surrounding such stream of fuel gas, to mix such gases together outside said source means and form a combustible gas mixture within said region; burning said gas mixture and said metal within such region, thereby producing intense heat and disintegrating an adjacent zone of said body; advancing said source means within said body, to similarly produce heat adjacent successive zones of such body and progressively disintegrate them; and concurrently removing disintegrated portions of said body from adjacent said zones by a flowing stream of an ejection fluid.

8. Process for thermally working minerals and like substances, as by piercing, cutting, grooving, or otherwise disintegrating them, which comprises directing at least one stream of a combustible fluid upon the substance being worked within a selected region, concurrently directing into said region and substantially surrounding said stream or streams a flowing body of a combustion-supporting gas, burning the said combustible fluid in said region, thereby producing intense heat and disintegrating an adjacent zone of said substance, advancing the burning combustible fluid to progressively disintegrate successive zones of said substance, continuously removing the disintegrated material from adjacent said zones under the action of a flowing stream of an ejection fluid, and concurrently moistening the disintegrated material thus ejected prior to its discharge into the atmosphere.

9. Process for thermally working minerals and like substances, as by piercing, cutting, grooving, or otherwise disintegrating them, which comprises directing at least one stream of a combustible fluid upon the substance being worked within a selected region, concurrently directing into said region and surrounding said stream or streams a flowing body of a combustion-supporting gas, concurrently directing into said region and surrounding said combustion-supporting gas a flowing body of a mixture of a combustion-supporting gas and a fuel gas, burning said combustible fluid and said fuel gas in said region thereby producing intense heat and disintegrating an adjacent zone of said substance, advancing the burning combustible fluid to progressively disintegrate successive zones of said substance, and continuously removing disintegrated material from adjacent said zones while maintaining said combustion and disintegration.

10. Process as defined in claim 9, wherein the respective combustion-supporting gas and the said combustible fluid are directed into the said region in non-parallel streams, and wherein the mixture of combustion-supporting gas and fuel gas is directed toward the sides of the hole, cut, groove, or the like being produced.

11. Process as defined in claim 9, wherein said combustible fluid carries in suspension therein a finely-divided combustible metal.

12. Process as defined in claim 8, wherein the respective combustible fluid and said combustion-supporting gas are introduced into said zone in non-parallel streams.

13. Process as defined in claim 8, wherein said combustible fluid carries in suspension therein a finely-divided combustible metal.

14. A heating instrumentality comprising means for discharging a fuel stream; means for separately discharging a combustion-supporting gas adjacent to said fuel stream; said fuel-discharge means and said combustion-supporting gas-discharge means being so constructed and arranged that said fuel and combustion-supporting gas will be caused to mix externally of said instrumentality to minimize the occurrence of flashbacks and produce on ignition a flame of the diffusion type; and means for separately discharging a combustible gas mixture around such fuel stream and such combustion-supporting gas.

15. A heating instrumentality comprising means for discharging a fuel stream; means for separately discharging a combustion-supporting gas adjacent to said fuel stream; said fuel-discharge means and said combustion-supporting gas-discharge means being so constructed and arranged that said fuel and combustion-supporting gas will be caused to mix externally of said instrumentality to minimize the occurrence of flashbacks and produce on ignition a flame of the diffusion type; means for separately discharging a combustible gas mixture; and means adjacent to the forward end of said instrumentality for discharging an ejection fluid.

16. A heating instrumentality comprising a tip having a longitudinal passage terminating in a flaring orifice at the forward end thereof; said tip having a plurality of side passages for a combustible gas mixture diverging forwardly from the axis of said instrumentality and having apertures in the surface of said tip arranged about said flaring orifice, such side passages being in communication with said longitudinal passage; a first tube disposed in said longitudinal passage in spaced relation to the wall thereof, and arranged to discharge through said orifice; a second tube communicating at its front end with said longitudinal passage; and a third tube associated at its front end with said tip and communicating with said side passages; one of said first and second tubes being adapted to conduct a combustion-supporting fluid, and the other of said first and second tubes being adapted to conduct a fluid fuel, said third tube being adapted to conduct the same fluid as said first tube.

17. A heating instrumentality for thermally working minerals and like substances, as by piercing, cutting, grooving, or otherwise disintegrating them, comprising means for directing heat within a selected zone on such substance to produce a hole, cut, groove, or the like; means for discharging a debris-ejection fluid into such hole, cut, groove, or the like in such a direction as to eject debris therefrom; and means for separately discharging a debris-wetting liquid into such hole, cut, groove, or the like.

18. A process of thermally piercing a hole in a solid body of mineral or like material, which process comprises discharging from suitable source means, and adjacent a selected area of a face of said body, a stream of fuel gas carrying in suspension therein finely-divided combustible metal, and a separate flowing body of combustion-supporting gas surrounding and directed to intersect the path of flow of said stream of fuel gas, to mix such gases together outside said source means and form a combustible gas mixture; burning said gas mixture and said metal and directing the resulting flame against the face of said body within said area, thereby producing intense heat and disintegrating an adjacent zone of said body to produce the initial portion and mouth of such hole; progressively advancing said source means into said initial portion of such hole, and into successive portions of such hole as formed, to similarly produce heat adjacent successive zones of said body and progressively disintegrate them, forming successively deeper portions of such hole; and concurrently removing disintegrated material from said portions of such hole by a stream of ejection fluid flowing rearwardly from adjacent said zones toward the mouth of such hole.

19. A process for thermally working a solid body of mineral or like material, which process comprises directing at least one stream of a combustible fluid against the body being worked within a selected region; concurrently directing into said region and adjacent to said combustible fluid a separate flowing body of a combustion-supporting gas, said combustible fluid and said combustion-supporting gas mixing together in said region to form a combustible mixture; burning the said combustible mixture in said region, thereby producing intense heat and disintegrating an adjacent zone of said body; advancing the burning combustible mixture to progressively disintegrate successive zones of said body; concurrently removing disintegrated material from adjacent such zones by a flowing stream of an ejection fluid; and concurrently moistening the disintegrated material prior to its discharge into the atmosphere.

ROBERT B. AITCHISON.
CHARLES J. BURCH.
CHARLES W. SWARTOUT.